(No Model.)

J. B. WOODS.
NUT LOCK.

No. 498,834. Patented June 6, 1893.

Witnesses
L. C. Hills
E. H. Bond

Inventor:
John B. Woods.
By E. B. Stocking
Attorney

THE NORRIS PETERS CO., PHOTO-LITHO., WASHINGTON, D. C.

UNITED STATES PATENT OFFICE.

JOHN B. WOODS, OF MINEOLA, TEXAS.

NUT-LOCK.

SPECIFICATION forming part of Letters Patent No. 498,834, dated June 6, 1893.

Application filed March 8, 1893. Serial No. 465,101. (No model.)

*To all whom it may concern:*

Be it known that I, JOHN B. WOODS, a citizen of the United States, residing at Mineola, in the county of Wood, State of Texas, have invented certain new and useful Improvements in Nut-Locks, of which the following is a specification, reference being had therein to the accompanying drawings.

This invention relates to certain new and useful improvements in nut-locks, and it has for its objects among others to provide a simple and cheap nut lock, readily applied or removed when desired whereby the life of the device is materially lengthened. I provide a bolt with a longitudinal groove or slot in which fits a tongue or lug on a washer which is provided with a notch or notches into which may be forced a portion or portions of a washer made of bendable material, opposite portions of which are designed to be forced into notches in the faces of the nut and thus the nut and both washers are bound or held firmly together.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1:
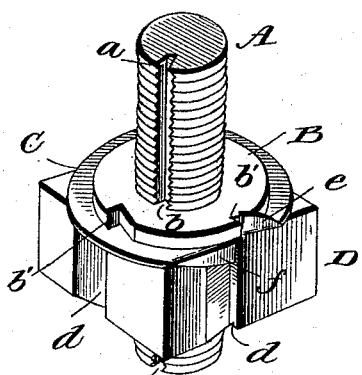
Figure 2:
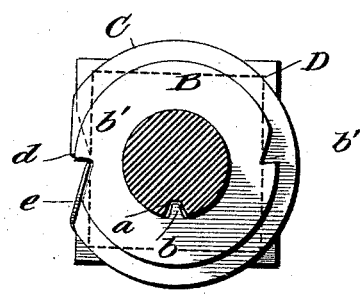
Figure 3:
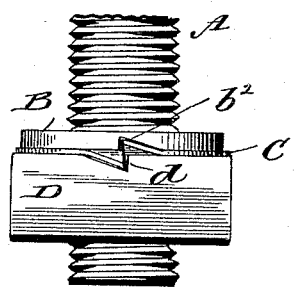
Figure 4:
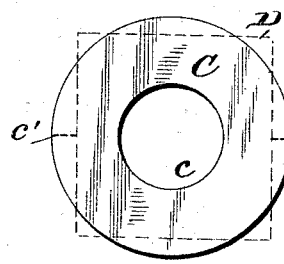

Figure 1 is a perspective view of my improved nut-lock. Fig. 2 is an end view thereof. Fig. 3 is a side elevation, showing a smaller washer. Fig. 4 is a plan of a washer larger than the nut, and Fig. 5 is a like view of a washer of smaller dimensions.

Like letters of reference indicate like parts throughout the several views.

Figure 5:
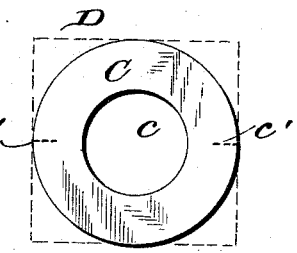

Referring now to the details of the drawings by letter, A designates a bolt which is provided with a longitudinal groove or slot $a$ which may assume any desired shape but preferably wedge-shaped as seen in Figs. 1 and 2 in order to better hold therein the tongue or lug on the washer B which may be of any size relatively to the nut as may also the bendable washer C, being shown in Figs. 1, 2 and 4 as larger than the nut, and in Figs. 3 and 5 as of such a size as to be arranged within the limits or boundary of the nut.

The washer B should be of rigid material and formed with a tongue or lug $b$ to fit the groove or slot in the bolt as seen in Figs. 1 and 2, and further provided with a notch or notches $b'$ as seen in said views, the said notch or notches being formed in the periphery of the washer, or they may be formed upon the face which comes adjacent to the washer C in use as seen in Fig. 3, the notch in the latter instance being lettered $b^2$. The washer C is made of some suitable bendable material and is provided with a bolt-opening $c$ sufficiently large to allow the washer to move loosely upon the bolt. The washer C may be provided with one or more slits $c'$ as seen in Figs. 4 and 5 to aid in the bending of the same up into the notch of the washer B and into the notch or notches $d$ of the nut D as shown in Figs. 1 and 3.

In practice the washer B is placed upon the bolt with its lug or tongue in the groove or slot of the bolt. Then the washer C is placed over the bolt and the nut screwed up. Then with a suitable instrument one portion of the washer C is turned up and into a notch in the washer B and the opposite portion turned in the opposite direction into a notch in the nut as seen best in Fig. 1, the bent portions being designated by the letters $e$ and $f$. If the notches in the nut and washer B are made in the faces of the nut and washer as seen in Fig. 3 instead of in the outer walls or peripheries as shown in Figs. 1 and 2, the washer will be bent accordingly as seen in Fig. 3. In either instance the bent portions will serve to bind the nut and washer B fast upon the bolt and prevent turning of the same. When it is desired to remove the nut the bent portions of the washer are bent out in the plane with the body of the washer when the nut can be turned in either direction desired.

The washer B may sometimes be square as seen in dotted lines in Fig. 2 and the bendable washer C designed to bend over the edge of the same. When the washer B is made with parallel straight sides it may be extended to form a strap washer to be used only where two bolts come near together as in tracks where two bolts come together on each end of the fish plate and are always the same distance apart. In this latter instance the groove in the bolt and the tongue on the washer may be dispensed with. With this form of washer no notches are necessary but the bendable washer is merely formed over the rigid square washer and then against the edges of the nut; the groove or slot $a$ and the tongue or lug $b$ remaining the same except where the bolts are near enough to admit of a strap washer being used. Then the strap washer obviates the necessity of a groove and tongue and any ordinary form of bolt and nut may be employed.

What I claim as new is—

1. The combination of a bolt with a groove, the rigid washer having a tongue to engage said groove, a nut and a bendable washer interposed between the nut and rigid washer and having slits, the rigid washer and the nut being formed with notches upon their adjacent faces whereby the bendable washer may be bent out of its normal plane and into said notches to lock the nut and washer, substantially as specified.

2. The combination of a bolt with a groove, the rigid washer having a tongue to engage said groove, a nut and a bendable washer interposed between the nut and the rigid washer and having slits, the rigid washer and the nut being formed with notches upon their adjacent faces, said notches being formed with oppositely inclined faces and coincident shoulders whereby the bendable washer may be bent out of its normal plane and into said notches to lock the nut and washer, substantially as specified.

In testimony whereof I affix my signature in presence of two witnesses.

JOHN B. WOODS.

Witnesses:
R. N. STAFFORD,
W. McLILES.